United States Patent [19]

Nitzberg et al.

[11] Patent Number: 4,827,961

[45] Date of Patent: May 9, 1989

[54] HIGH VELOCITY FLUID SWIVEL JOINT COUPLING

[75] Inventors: Leonard R. Nitzberg, Knoxville, Tenn.; Paul D. Carmack, Tipp City, Ohio

[73] Assignee: Helix Enterprises, Inc., Knoxville, Tenn.

[21] Appl. No.: 259,017

[22] Filed: Oct. 18, 1988

Related U.S. Application Data

[63] Continuation-in-part of Ser. No. 107,947, Oct. 13, 1987, Pat. No. 4,779,638, which is a continuation-in-part of Ser. No. 173,362, Mar. 25, 1988.

[51] Int. Cl.$^4$ ............................................. F16K 17/14
[52] U.S. Cl. .................... 137/68.1; 137/811; 137/812; 137/833; 251/126
[58] Field of Search ............... 251/126; 137/803, 810, 137/811, 812, 833, 68.1, 614.04; 285/2, 272

[56] References Cited

U.S. PATENT DOCUMENTS

| 194,016 | 8/1877 | Title et al. | 251/126 |
| 1,118,107 | 11/1914 | Clasen | 285/1 |
| 4,495,965 | 1/1985 | Ise | 251/126 |
| 4,646,773 | 3/1987 | Klop et al. | 137/68.1 |

FOREIGN PATENT DOCUMENTS

| 440520 | 2/1975 | U.S.S.R. | 137/803 |
| 836439 | 6/1981 | U.S.S.R. | 137/811 |

Primary Examiner—A. Michael Chambers
Attorney, Agent, or Firm—Alan Ruderman

[57] ABSTRACT

A fluid swivel joint coupling has first and second body members pivotably connected together for pivoting about a swivel axis. The first body member includes an inlet portal, an outlet portal, a diverted fluid passageway opening into the outlet portal and a channel communicating the inlet portal with the diverted passageway. The second body member is pivotably mounted in flow communication with the outlet portal and has a second diverted passageway communicating through a second channel to a third portal. Each channel has an axis of elongation offset from the swivel axis so that fluid may enter the diverted passageway in the first body member tangentially from the first channel and flow therethrough in vortex fashion along the swivel axis into the second diverted passageway and leave the second diverted passageway tangentially to flow out the second channel. The body members may have interlocking elements which cooperatively couple, and which uncouple when a tensile force above a predetermined limit is interposed between the inlet portal and the third portal, and in that case the diverted passageways have volute configuration about valving which shuts flow through the body members when they uncouple. The fluid thus flows in a one revolution spiral to the first diverted passageway and from the second diverted passageway.

12 Claims, 2 Drawing Sheets 4,827,961

HIGH VELOCITY FLUID SWIVEL JOINT COUPLING

REFERENCE TO RELATED APPLICATIONS

This application is a continuation-in-part of copending application Ser. No. 07/107,947 filed Oct. 13, 1987, now U.S. Pat. 4,779,638 issued Oct. 25, 1988 and is a continuation-in-part of copending application Ser. No. 07/173,362 filed Mar. 25, 1988.

BACKGROUND OF THE INVENTION

This invention relates to a fluid line swivel connector, and more particularly to a swivel joint connector having vortex generating passageways for maintaining laminar flow of a fluid flowing through the connector at high velocity and flow rate, the centrifugal force on the fluid acting to ensure that the fluid follows the desired flow path at the high velocity and flow rate.

It is known in the fuel dispensing art to include a swivel connector at the dispenser/hose interface so that twisting loads applied to the dispenser are not transmitted to the hose resulting in twisting and pinching thereof. Such swivels permit the dispenser, such as a fuel dispensing nozzle, to be pivoted about one or more axes relative to the axis of the hose, the swivel permitting flow communication means between the hose and the dispensing device.

Additionally, it is known to utilize quick disconnect or breakaway couplings in the fuel line spaced from the dispenser so that if a vehicle is driven away from the fuel dispensing station before the dispensing nozzle is removed from the filler neck of the vehicle, an uncoupling will result, shutting the flow of fuel and preventing the volatile fuel to be spilled due to either a dislodging of the moorings of the fuel dispensing station, breakage of the hose, or other failure of the fuel dispensing system. The prior art has proposed a number of decouplers which are actuated by a tensile force in the line. In our aforesaid copending application Ser. No. 07/107,947, the problems and deficiencies of the prior art decoupler units was described and combination swivel joint and quick disconnect coupling means are disclosed and claimed, the devices having coupling means between first and second body members which swivel relatively to one another and the coupling means acting normally to connect the body members in flow communication and for decoupling when an external tensile force above a predetermined level is applied to the fuel line, and valving acting for shutting flow communication when the body members are decoupled.

In the dispensing of fuel to passenger vehicles or the like fuel is currently supplied at flow rates in the order of 8 to 15 gallons per minute so that devices as disclosed in our aforesaid copending patent applications adequately permit the fuel to flow therethrough. However, when dispensing fuel to large vehicles, such as trucks or the like, having high capacity fuel tanks, the flow rates are in the range of 30 to 45 gallons per minute in order to reduce the time required to fill the tank. The known prior art swivel connectors, however, limit the rate to 30 gallons per minute and for this reason many of the large vehicle fuel dispensing stations do not use swivel couplings so as to permit the fuel rate to be maximized at, for example, the 45 gallons per minute rate. This however, is inconvenient since a swivel joint connector is more convenient to use and since it prevents twisting and pinching of the fuel line and similar difficulties.

SUMMARY OF THE INVENTION

Consequently, it is a primary object of the present invention to provide a fluid swivel joint coupling capable of communicating fuel at high flow rates and velocities.

It is another object of the present invention to provide a fluid swivel joint coupling having vortex creating passageways which permits the fuel to flow in laminar fashion through the coupling.

It is a further object of the present invention to provide a fluid swivel joint coupling for mounting in a fuel supply line at a fuel dispensing station, the coupling having detachable means for uncoupling when the tensile force on the line is above a predetermined level, and having vortex creating fluid passageways for permitting the fuel to flow in laminar fashion through direction changing passages within the coupling.

It is a still further object of the present invention to provide a fluid swivel joint coupling for mounting in a fuel supply line at a fuel dispensing station, the coupling having detachable means for uncoupling when the tensile force on the line is above a predetermined level, and having vortex creating fluid passageways for permitting the fuel to flow in laminar fashion through direction changing passages within the coupling, the coupling having valve means for shutting flow therethrough when uncoupled, and the passages having volute configurations about the valve means.

Accordingly, the present invention provides a fluid swivel joint coupling having a body member including a first portal, a second portal and a diverted fluid passageway therebetween. A connecting member having first and second ports and a diverted passageway therebetween is pivotably connected to the body member for rotation about a swivel axis extending through both diverted passageways with the second portal and the first port in flow communication. A fluid channel within the body member communicates fluid between the first and second portal, while a fluid channel within the connecting member communicates fluid between the first and second ports so that fluid may flow either into the first portal and out the second port or into the second port and out the first portal. Each channel has an axis of elongation offset from the swivel axis so that fluid may enter one of the diverted passageways tangentially from the respective channel and flow therethrough in vortex fashion along the swivel axis into the other diverted passageway and leave said other diverted passageway tangentially to flow out the respective channel.

By feeding the fluid into the diverted passageway of either the body member or the connecting member in a direction offset from the swivel axis, the fluid is given a spinning movement and a vortex is produced. The centrifugal forces produced by the vortex prevents separation of the fluid from the walls of the input member to maintain substantially laminar flow therethrough. The flow continues in vortex fashion into the diverted passageway of the other or output member and is released as the fluid leaves the exit channel in a direction offset from the swivel axis.

In accordance with another aspect of the invention, the body member and connecting member may be detachably connected to uncouple when an excessive tensile force is applied across the coupling in a similar manner to our aforesaid copending patent applications. In this instance valve means are provided within the respective diverted passageways which close flow communication therebetween when the members uncouple, and in order to ensure that the flow continues within the diverted passageways in vortex fashion with the valve means disposed therein, the valving effectively is offset in the passageways so that the passageways have a volute configuration. The fluid effectively flows in a one revolution spiral to or from the respective diverted passageway.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENTS

Figure 1:
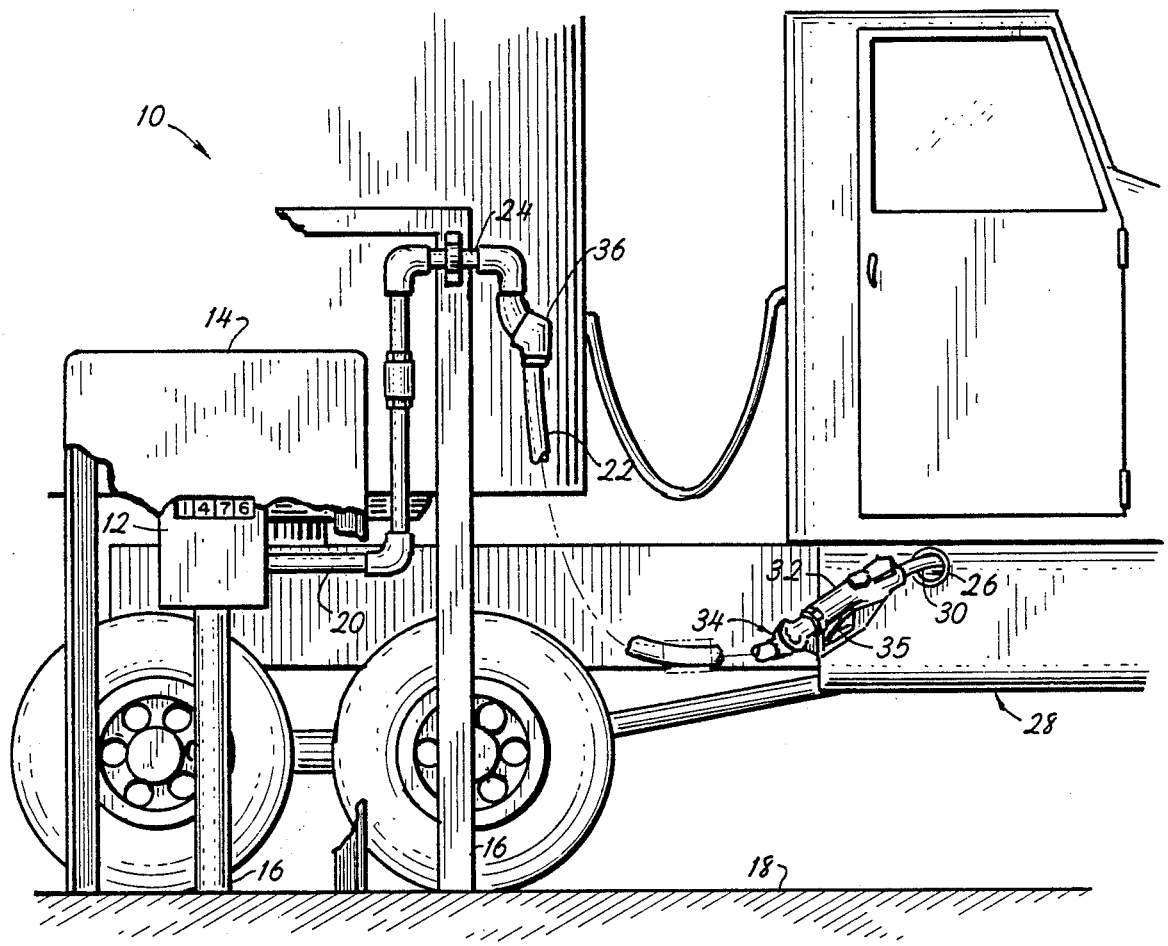
FIG. 1 is an elevational view of a portion of a truck at a fuel dispensing station illustrating fuel being dispensed into the truck from pumping apparatus having a fuel delivery line incorporating a fluid swivel joint coupling constructed in accordance with the principles of the present invention.

Referring now to the drawings, a swivel joint coupling according to the present invention may be utilized in connection with fuel dispensing facilities of various types such as those dispensing stations which dispense gasoline and diesel fuel to large vehicles such as trucks and buses. Although other applications may readily be envisioned, for disclosure purposes the present invention will be described in conjunction with fuel dispensing stations located at truck service stations. Thus, as illustrated in FIG. 1, a dispensing station generally indicated at 10 includes measuring apparatus 12 adapted to receive and measure pressurized liquid fuel, such as gasoline and fuel oil, pumped from a remotely located storage tank through underground piping (not illustrated), the pumping equipment being adapted to be manually actuated by an operator using the facility. The measuring equipment is generally mounted within a cabinet 14 or the like secured to structural framework such as members 16 anchored by conventional means to an island on which the dispensing station is supported or to the ground 18.

Metered fuel exits the measuring equipment after being pumped thereto and from there conventionally flows through piping generally indicated at 20 comprising various conventional piping couplings, nipples, fittings and other conventional connecting members which convey the fuel from the measuring equipment to a flexible hose 22. Adjacent the connection with the hose, and intermediate that location and the measuring equipment, the piping 20 is anchored by conventional anchoring means 24 to a structural support, which may be part of the structural framework 16. The anchoring means 24 secures the piping and resists the external loads which may be placed on the various components to thereby resist damage to those components and the measuring apparatus 12. The flexible hose 22 is of a conventional re-enforced construction as approved by the appropriate regulatory bodies, and may be of any convenient size and length to permit an operator to easily reach the fuel tank inlet 26 of a vehicle 28 for insertion therein of the spout 30 at the end of a rigid dispensing nozzle 32, the nozzle being connected in flow communication with the hose 22 either directly or by means of a swivel joint connector, which preferably may be a swivel joint connector or coupling 34 constructed in accordance with the principles of the present invention in order to provide the required flow rates for fueling such large vehicles within a reasonable time. Alternatively, the swivel joint connector 34 may be placed between the hose and the rigid piping, such as at 36. However, for purposes of describing the invention, the coupling 34 is disclosed as between the nozzle 32 and the hose 22, the hose being a flexible conduit. Conventionally, the nozzle includes valving in the fluid passageway in the body thereof, the valving being controlled by an adjustment trigger 35 biased to close the valving and operable to open the flow passageway upon depression or squeezing by the operator.

Figure 2:
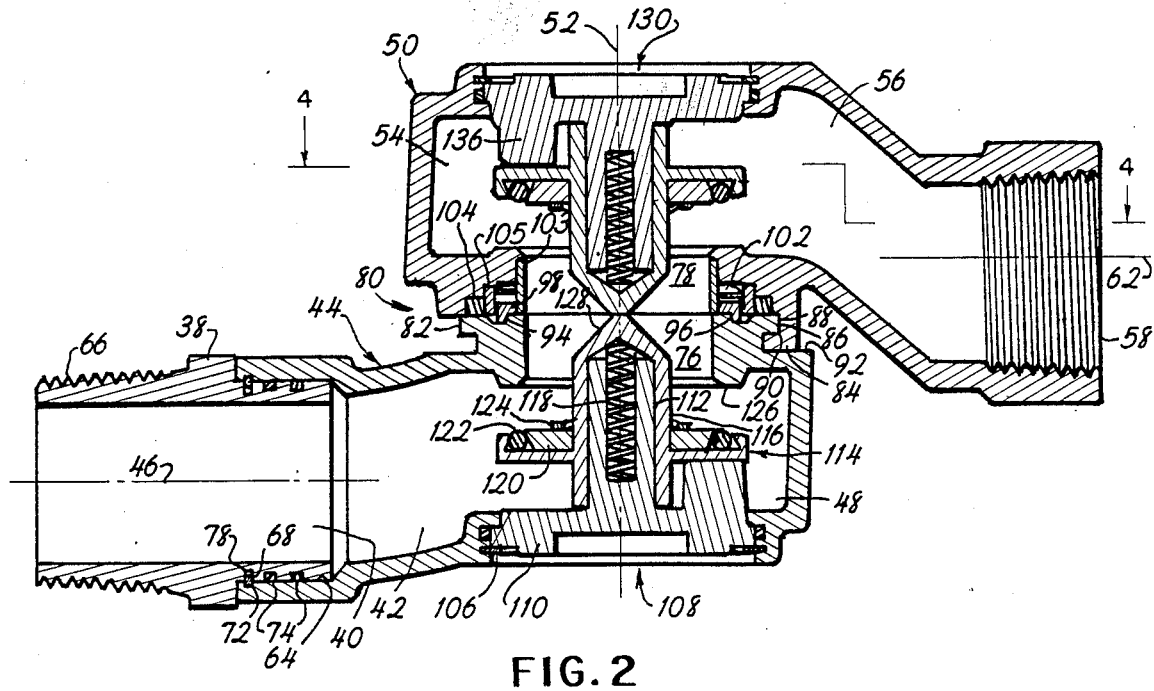
FIG. 2 is a vertical cross-sectional view taken substantially through the longitudinal center of the swivel joint coupling disclosed in FIG. 1.
Figure 3:
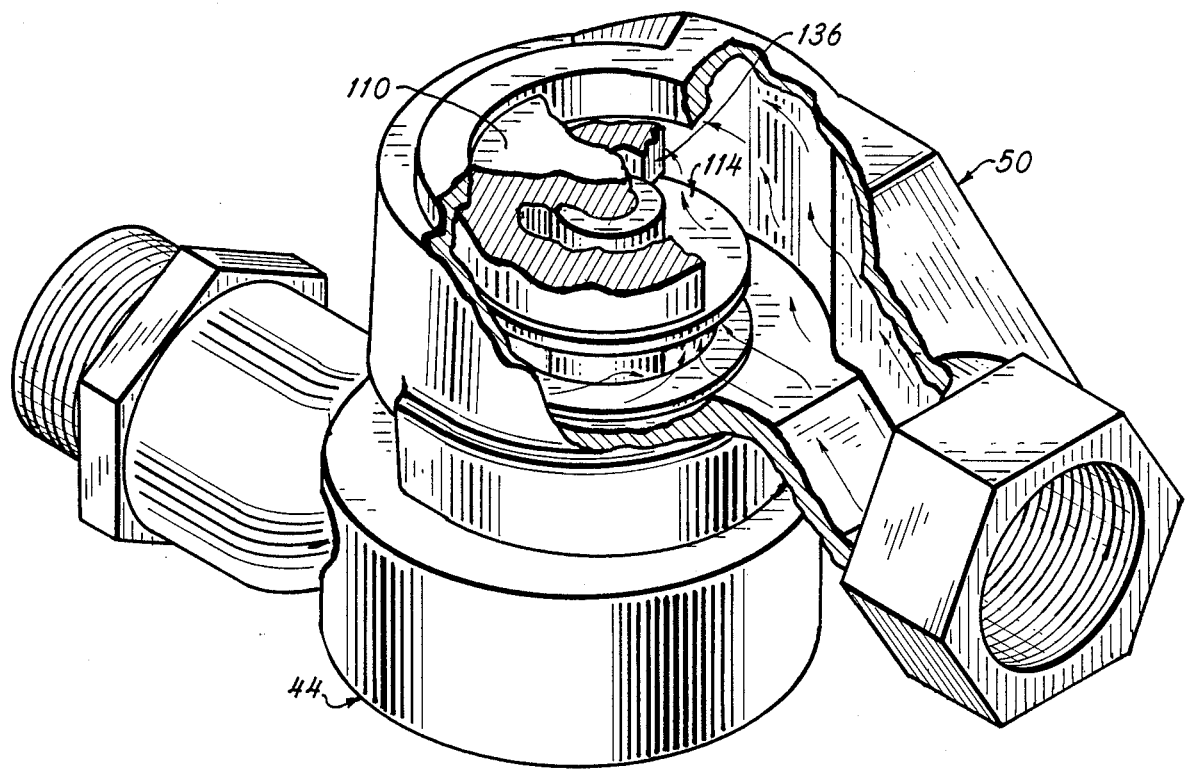
FIG. 3 is a perspective view partly broken away of the swivel joint coupling illustrated in FIG. 2.
Figure 4:
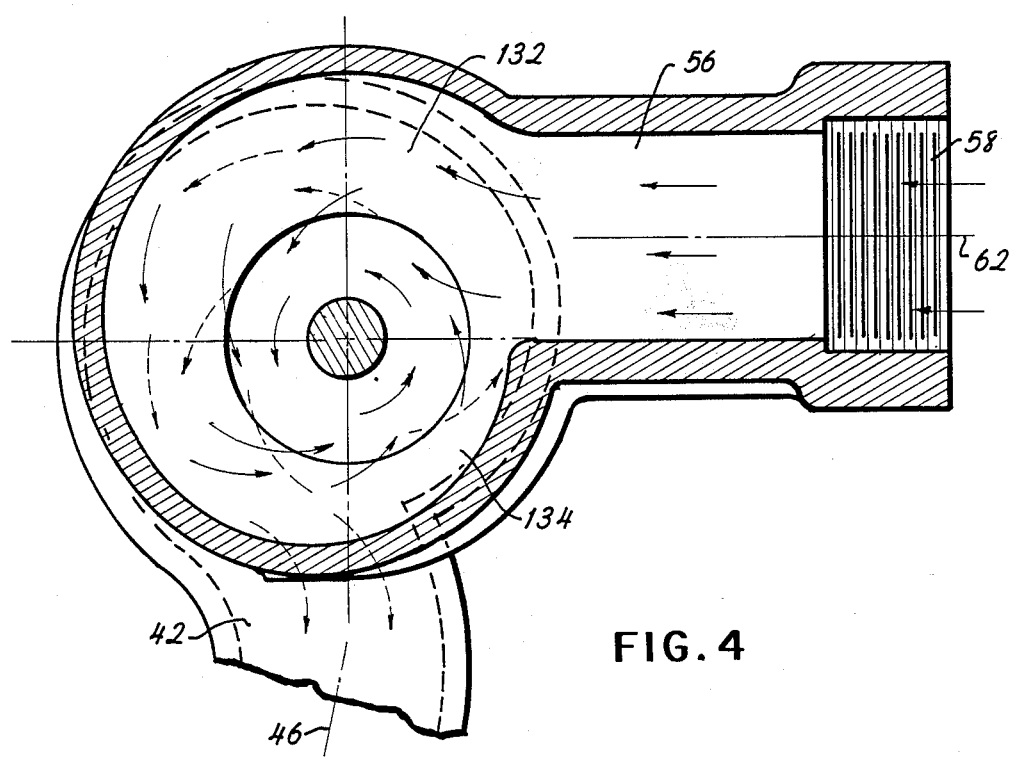
FIG. 4 is a fragmentary cross-sectional view taken substantially along line 4—4 of FIG. 2.

The preferred form of the swivel joint coupling 34 will clearly be understood with reference to FIGS. 2 through 4. Preferably the coupling includes a connector 38 which may be attachable at its free end to the rigid nozzle 32 depicted in FIG. 1 and is mounted within a portal 40 opening into a channel 42 of a body member 44 for relative rotation about a pivot axis 46. The channel 42 communicates with a diverted fluid passageway 48, as hereinafter described, within the body member 44. The body member 44 is additionally connected to a connecting member 50 for relative rotation about a swivel axis 52, the connecting member 50 having a diverted fluid passageway 54, as hereinafter described, which normally communicates the passageway 48 within the body member 44 to a channel 56 opening at port 58 at its free end where it may be attached to the flexible hose 22 depicted in FIG. 1. The passageway through the body member 44 is diverted from the longitudinal axis 46 of the portal 40 and channel 42 in the horizontal plane as seen in FIG. 4, while the passageway 54 in the connecting member 50 is diverted from the direction of fluid flow between the body member 44 substantially along the axis 52 to a direction extending in a line of flow along the longitudinal axis 62 through the channel 56 and the portal 58.

Although the coupling 34 may be a direct flow-through swivel coupling for permitting pivotable swiveling about the axis 52, the preferred mode of the swivel joint coupling of the present invention is disclosed as a detachable quick disconnect or breakaway swivel coupling of the type disclosed in the earlier of our aforesaid copending patent applications, and it is preferred that the connector 38 also is pivotable relative to the body member 44. Accordingly, the connector 38 comprises a conduit which preferably is a male member connected within an annulus 64 at the end of the channel 42 of the body member 44 and rotatable relative thereto about the axis 46, the annulus 64 defining the portal 40 for permitting ingress or egress of fluid for communication thereof through the conduit or connector 38. Threads 66 on the outside surface of the connector 38 exterior of the body member 44 are adapted to connect this member to a rigid conduit such as the nozzle 32, in which event the portal 40 defined by the annulus 64 is the exit portal of the swivel coupling. Alternatively, the threads may connect the member 38 to rigid piping and the annulus 64 will then define the inlet portal 40. An annular spring type retaining or detent member 68 positioned within an annular recess 70 formed in the outside wall of the connector 38 and received within an annular recess 72 in the inner wall of the annulus 64 permits the member 38 to swivel or rotate relative to the body 44 about the axis 46. A pair of seals in the form of "O" rings 74 preclude leakage of fluid through the portal due to the relative rotation.

The channel 42 is defined within the interior of the body member 44, and the axis 46 of this channel is offset in direction from the swivel axis 52, the amount of offset being such that the fluid flowing therethrough enters the passageway 42 tangentially from the passageway 48. As illustrated in FIG. 4 it is preferred that the entire channel is offset from the axis 52, but smaller offsets may be tolerated. The fluid which is received by the body member 44 in vortex fashion, as hereinafter described, is thus released from the cyclonic action of the vortex as it flows from an inlet portal 76 in the body member 44 into the channel 42. In this instance the passageway 48 is diverted 90° relative to the channel 42. The portal 76 is disposed about the axis 52 and is the inlet portal of the body member 44 when the portal 40 defined in the annulus 64 is the outlet portal, and vice versa. The portal 76 is mounted in flow communication with a port 78 in the connecting member 50 by means of a pivotable connection such that the body member 44 may swivel or rotate relative to the connecting member 50 about the swivel axis 52. The connecting member 50 includes the diverted passageway 54 extending from the port 78 disposed about the axis 52 to the channel 56. Again in this instance the passageway 54 is diverted 90° relative to the axis of the channel 56 and the portal 58 which are disposed along the axis 62 as illustrated in the drawings. The port 78 functions as an outlet and the port 58 as an inlet of the connecting member 50 when the portal 76 is the inlet to the body member 44. The channel 56 is defined within the interior of the connecting member 50, and the axis 62 of this channel is offset in the direction from the swivel axis 52, the amount of offset being such that the fluid flowing therethrough enters the passageway 54 tangentially from the channel 56. As illustrated in FIG. 4, it is preferred that the entire channel 56 is offset from the axis 52, but again smaller offsets may be tolerated. The fluid then flows in cyclonic or vortex fashion through the passageway 54 through the port 78 in the connecting member and into the portal 76 of the body member 44. Thus, both the body member 44 and the connecting member 50 have respective channels 42, 56 having axes of elongation offset from the swivel axis by an amount sufficient such that the flow which enters the passageway 54 in the connecting member 50 enters tangentially for providing centrifugal forces on the fluid to induce a vortex within the passageway 54, while the channel 42 in the body member 44 has an axis of elongation offset from the swivel axis such that the whirling flow of the vortex in the passage 48 is released tangentially into the channel 42 to release the centrifugal forces of the vortex as the fluid flows through the channel 42.

The body member 44 and the connecting member 50 may be pivotably connected together in conventional manner similar to the pivotable connection between the connector 38 and the body member 44. However, if it is desired that the swivel joint function to separate when an extraneous tensile force on the fluid line is above a predetermined level, the body member 44 and the connecting member 50 may have interconnectable means generally indicated at 80 such as that disclosed in our aforesaid patent applications. The means 80 permits the connecting member 50 and the body member 44 to rotate relative to each other about the axis 52 when coupled and to forcibly uncouple by sliding apart as a result of the excessive extraneous tensile force applied between the connector 38 at one end of the body member 44 and the remote end of the connecting member 50 along a line of action with respect to the axes 46 and 62. The interconnectable means 80 comprises interlocking members 82 and 84 on the body member 44 and the connecting member 50 respectively. These interlocking members are constructed in a mortise and tenon fashion in the sense that member 82 is received within a dado slot 86 formed in step fashion between the member 84 and a surface 88 of the connecting member 50, the member 82 including a lip 90 spaced from a ledge 92 formed on the body member 44, and the member 84 is received within the space between the lip 90 and the ledge 92. The interlocking member 84 is an arcuate substantially semi-circular segment formed about the axis 52 at the port 78 of the connecting member 50. The interlocking member 82 is an annular hub formed about the portal 76 in the body member 44, the center of the annulus being the axis 52. The interlocking members 82 and 84 thus have corresponding surfaces which interface together when the body member 44 and the connecting member 50 are slidably juxtaposed into coupling engagement, and may rotate relative to one another when so coupled.

A peripheral wall 94 of the interlocking member 82 has a conically tapered form, the taper being from a recess 46 to the outer surface spaced from the lip inwardly remote from the ledge 92. When the members 82 and 84 are joined, the conically tapered portion of the member 82 interfaces with a correspondingly tapered internal portion of an annular detent ring 98, the detent ring 98 being urged into engagement with the member 82 by means of a preloading bias wave spring 100. The detent ring 98 and the spring 100 are received within an annular well or recess 102 formed in the connecting member 50 and disposed about an annular retaining member 103 positioned in a seat in the connecting member 50. As so held the member 82 is prevented from moving relative to the member 84 in the direction of disengagement, while the conically tapered wall portion 94 of the member 82 may rotate within the cooperating surface of the detent ring 98, the latter also acting as a bearing surface for such rotation. An annular seal such as "quad" ring 104 disposed in a groove in the recess 102 formed by an annular insert 105 spaced from the retaining member 103 acts as a fluid seal to prevent leakage as fluid flows through the port 78 and 76 portal. Thus, an infrangible release is provided by the cooperation of the interlocking members and the detent ring, the release acting to uncouple the body member 44 and the connecting member 50 upon application of a tensile load in excess of a predetermined level in the direction of disengagement.

Valving means is provided in each of the body members 44 and the connecting member 50, which valving means is disposed to maintain the portal 76 and port 78 in flow communication with each other when the members 44 and 50 are coupled together, yet close the respective passageways when the members are uncoupled. Thus, an annular retaining ring 106 is disposed in a cavity 108 in the body member 44 for positioning a valve cap 110 therein. The cap 110 includes a guide spindle 112 extending susbstantially along the axis 52. A check valve 114 having an integral hollow stem 116 receives the spindle 112 and is movable along the axis 52 guided by the spindle 112, while a coil spring 118 within a hollow in the spindle 112 acts to bias the check valve 114 toward the portal 76. An annular check valve seat 120 including a seal 122 is disposed about a rim of the check valve 114 and is retained thereon by means of a retaining member 124. When the body member 44 is disconnected from the connecting member 50 the seal 122 of the valve seat 120 is forced into cooperation with an annular seat 126 to close the portal 76, and when this occurs the free end 128 of the valve stem 116 projects out of the portal 76. An identical valving structure is disposed within a cavity 130 of the connecting member 50 for closing the port 78 therein when the connecting member 50 is uncoupled from the body member 44 and the reference numbers in regard thereto are omitted for purposes of clarity. When the members are coupled together the free ends 128 of each of the valve stems 108 are forcibly engaged to overcome the bias of the respective spring 118 and open the flow path through the port 78 and portal 76.

As aforesaid the inclination of the channels 56 and 42 to the respective passageways 54 and 48 drives the fuel into the whirling vortex, and the passageways 54, 48 present no obstacle to break the vortex when the swirl has no breakaway or detachable means. However, when the detachable coupling structure is provided, the valving within the passageways tends to undo the swirl and break the vortex. For this reason, when valving is present, as in the preferred embodiment, the passageways should have a volute configuration, i.e., a spiral passage about the valving. Thus, as illustrated in FIG. 4, and in FIG. 3 with regard to the connecting member 50, in FIG. 3, the passageways 54 and 48 are disposed about the respective valve means in volute fashion, the volute contracting from a larger portion such as at 132 adjacent the exit of the channel 56 to a smaller portion, such as at 134 adjacent the inlet to the port 78, and expanding about the valving in the body member 44 from the portion 76 to the inlet of the channel 42. This ensures that the fluid does not separate from the walls of the passageways so that laminar flow is maintained. Additionally, each valve cap 110 includes a spiral shaped segmental vane 136 extending into the respective passageway 48, 54. The vane 136 in the connecting member 50 acts as a baffle for directing some of the flow entering the passageway 54 from the channel 56 over the check valve 114 and into the volute while maintaining the swirling vortex action. In regard to the body member 44, the spiral shaped vane acts as a baffle for directing some of the flow out of the volute in the passageway 48 while maintaining the vortex so that the fluid flows tangentially out into the channel 42.

Accordingly, there is provided a fluid swivel joint coupling for fuel dispensing systems which may be detachably coupled for uncoupling when an excess of tensile force is applied across the fuel line, the coupling having an inlet channel supplying the fuel tangentially to a passageway to set up a vortex, and an outlet channel receiving the vortex flow tangentially from the passageway to release the vortex. In this manner the fuel may flow through the coupling at high velocities and flow rates without the fuel separating from the walls of the passageway as the fuel is diverted by the turns within the passageway which would result in turbulence and reduced flows. Thus, the present invention eliminates the turbulence and permits the fuel to flow through the coupling at the high velocities and fuel rates required for fueling large vehicles.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A fluid swivel joint coupling having a first body member including an inlet portal, an outlet portal and a first diverted fluid passageway therebetween, a first channel connecting said inlet portal with said first diverted passageway, said first channel having a longitudinal axis extending therethrough, a second body member pivotably connected to and in flow communication with said outlet portal for rotation about a swivel axis passing through said outlet portal and the body members, said second body member having a second diverted passageway communicating said outlet portal with a third portal so that fluid may flow through the swivel joint between the inlet and third portals, a second channel communicating said third portal with said second diverted passageway, said second channel having a longitudinal axis extending therethrough, said first channel and the longitudinal axis thereof being offset from said swivel axis by a sufficient amount such that the flow enters the first diverted passageway tangentially thereto for providing centrifugal forces on said fluid to induce a vortex within said first diverted passageway, and said second channel and the longitudinal axis thereof being offset from said swivel axis by a sufficient amount such that the flow is received from the second diverted passageway tangentially thereto for releasing the centrifugal force to terminate said vortex.

2. A fluid swivel joint coupling as recited in claim 1, wherein the cross-sectional area of the first diverted fluid passageway decreases in area from the junction with said first channel to said outlet portal.

3. A fluid swivel joint coupling as recited in claim 2, wherein said cross-sectional area has a spiral configuration about said swivel axis.

4. A fluid swivel joint coupling as recited in claim 1, wherein the cross-sectional area of the second diverted passagway increases in area from said outlet portal to the junction with said second channel.

5. A fluid swivel joint coupling as recited in claim 4, wherein said cross-sectional area has a spiral configuration about said swivel axis.

6. A fluid swivel joint coupling as recited in claim 3, wherein the cross-sectional area of the second diverted passageway has a spiral configuration about said second axis expanding in area from said outlet portal to the junction with said second channel.

7. A fluid swivel joint coupling as recited in claim 1, wherein said first and second body members include cooperating interconnecting coupling means, said coupling means including locking means for locking said body members together in coupling relationship to permit relative rotation about said swivel axis and for unlocking said body members to permit uncoupling thereof when an external tensile force about a predetermined limit is applied between said first body member and said second body member.

8. A fluid swivel joint coupling as recited in claim 7, including valve means in said first body member and said second body member for shutting flow communication between said outlet portal and said third portal when said body members are uncoupled.

9. A fluid swivel joint coupling as recited in claim 8, wherein said first diverted passageway has a volute configuration contracting in area from the junction with said first channel to said outlet portal.

10. A fluid swivel joint coupling as recited in claim 8, wherein said second diverted passageway has a reverse volute configuration expanding in area from said outlet portal to the junction with said second channel.

11. A fluid swivel joint coupling as recited in claim 9, wherein said second diverted passageway has a reverse volute configuration expanding in area from said outlet portal to the junction with said second channel.

12. A fluid swivel joint coupling as recited in claim 11, wherein said volute and said reverse volute configurations spiral about said valve means and said swivel axis.

* * * * *